United States Patent
LaRocca

[19]

[11] Patent Number: 6,155,207
[45] Date of Patent: Dec. 5, 2000

[54] ADD-A-STEP

[76] Inventor: Anthony Alfred LaRocca, 131 Florence Ave., Arlington, Mass. 02476

[21] Appl. No.: 09/479,727

[22] Filed: Jan. 7, 2000

[51] Int. Cl.⁷ .................................................. A01K 13/00
[52] U.S. Cl. ........................................................... 119/706
[58] Field of Search .................................. 119/706, 482, 119/483, 28.5, 165, 485, 499, 498; 52/182; 482/52

[56] References Cited

U.S. PATENT DOCUMENTS

| D. 383,261 | 9/1997 | Karsten et al. | D30/160 |
| 4,301,766 | 11/1981 | Piccone | 119/706 |
| 5,634,440 | 6/1997 | Mogck | 119/847 |
| 5,711,253 | 1/1998 | Phillips et al. | 119/706 |
| 5,829,390 | 11/1998 | Jonilla et al. | 119/706 |

*Primary Examiner*—Thomas Price
*Attorney, Agent, or Firm*—Henry S. Miller

[57] ABSTRACT

Portable steps for small pets that includes one or more step assemblies adapted to stack one on another to a desired height.

8 Claims, 5 Drawing Sheets

ADD-A-STEP

BACKGROUND OF THE INVENTION

1. Field of the Invention

This invention relates generally to pet and animal furniture and more particularly to a functional article that forms a means for small pets to move from one elevation to another with ease.

2. Description of the Prior Art

Owners of small pets, particularly of the indoor variety, spend a disproportionate amount of time lifting their animal from one level to another. For example on to a bed or favorite chair which may be higher than the animal is able to leap. It is not uncommon for small pets to sleep on the same bed as their owners and jump down to the floor at any strange noise in the house, unable to climb back on to the bed without assistance. There currently exists no means that is designed particularly for pets that addresses this problem.

Examples of U.S. Patents that show the estate of the prior art but fail to anticipate the invention disclosed and claimed herein include, U.S. Pat. No. D383,261 issued Sep. 2, 1997 to Karsten et al., who shows an ornamental design for a step device for pets. U.S. Pat. No. 4,301,766 issued Nov. 24, 1981 to Piccone who discloses a furniture device for cats that consists of a plurality of interconnecting blocks. The U.S. Patent to Phillips et al., U.S. Pat. No. 5,711,253 issued Jan. 27, 1998 discloses a small animal connectable play cube system. A U.S. Patent was issued Nov. 3, 1998 to Ionilla et al for a door-mounted, scratch, exercise and perch structure for cats, and U.S. Patent to Mogck U.S. Pat. No. 5,634,440 issued Jun. 3, 1997 for a convertible step and ramp combination.

SUMMARY OF THE INVENTION

The invention is characterized in a first embodiment by a plurality of rectangular box like, assembled structures that vary in at least one dimension and are designed to be interlockably stacked thereby allowing a variable heights to be achieved. In a second embodiment rectangular box like structures are molded and designed to be interlockably stacked to provide a selection of variable heights.

The invention is further characterized by its diminutive dimensions and portability, which is a primary object of the invention.

It is another object of the invention to provide new and improved pet steps that are convenient to use.

It is a further object of the invention to provide new and improved pet steps are low in cost.

It is still another object of the invention to provide new and improved pet steps that are of a durable and reliable construction.

These, together with other objects of the invention, along with the various features of novelty which characterize the invention, are pointed out with particularity in the claims annexed to and forming a part of this disclosure. For a better understanding of the invention, its operational advantages and the specified objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF A PREFERRED EMBODIMENT

Figure 1A:
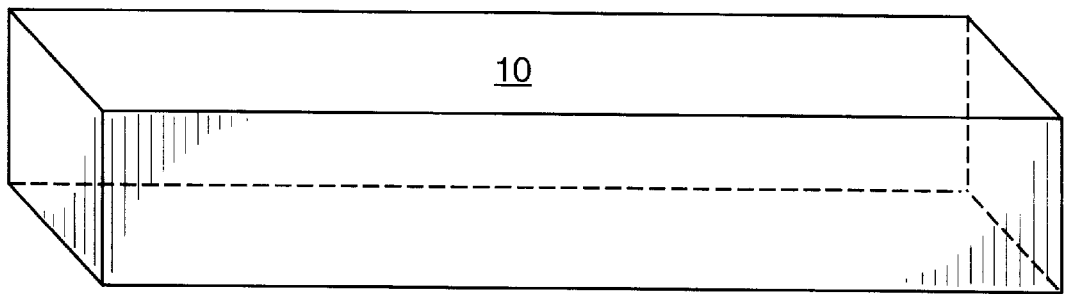
FIG. 1a is a isometric view of part of the invention.
Figure 1B:
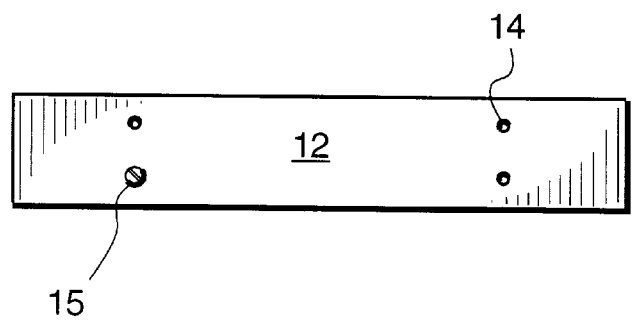
FIG. 1b is a side elevation view of a side rail to the invention.
Figure 1C:
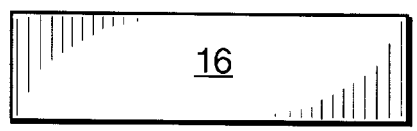
FIG. 1c is a side elevation view of a back rail to the invention.

Referring now to FIG. 1a, 1b and 1c, the first embodiment of the invention is formed multiple members typically in the shape of an elongated rectilinear box like structure 10 having two sides, two ends and a top and bottom. Side rails 12 and rear rail 16 are subsequently attached to member 10 during assembly, by screws 15 passing through holes 14 and engaging the sides of member 10.

Figure 1D:
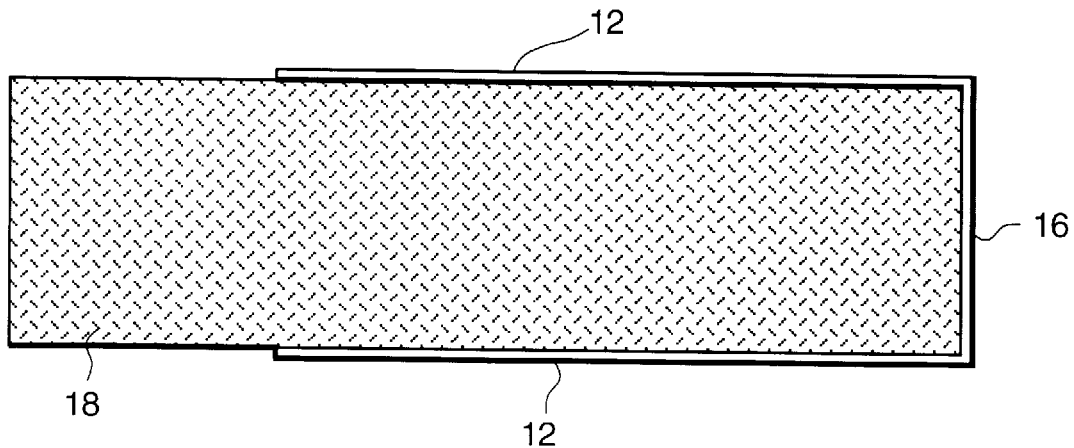
FIG. 1d is a top plan view of the invention.
Figure 1E:
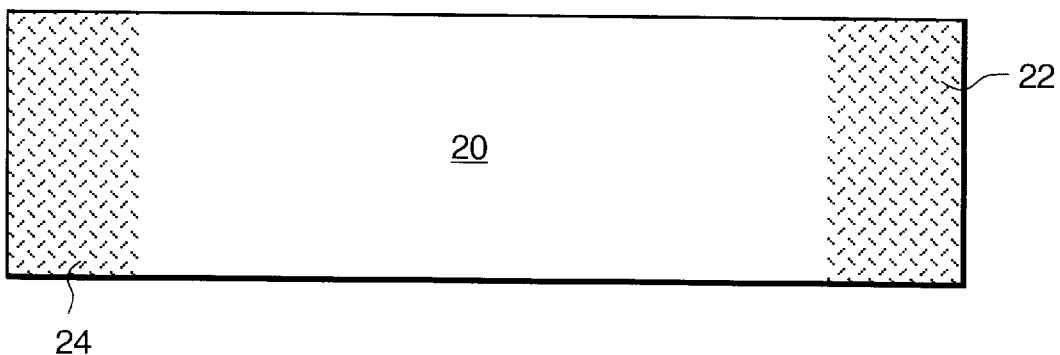
FIG. 1e is a bottom plan view of the invention.

FIG. 1d and 1e show the top and bottom surfaces of member 10. The top surface is covered in its entirety with a material 18 having a relatively high coefficient of friction for the purpose of reducing the likely hood of movement in the event another member is placed within the area defined by side rails 12 and rear rail 16. Bottom surface 20 of member 1 0 which is expected to rest on a floor, is covered with high friction material near each end as shown at 22,24. The members may be formed from wood, metal or other suitable material.

Figure 2A:
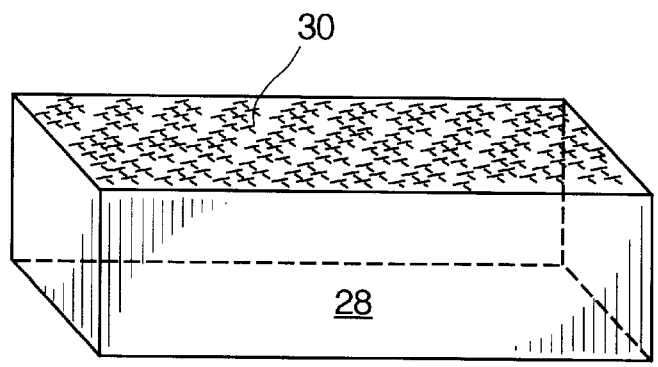
FIGS. 2a, 2b, 2c an exploded isometric view of one embodiment of the invention.
Figure 2B:
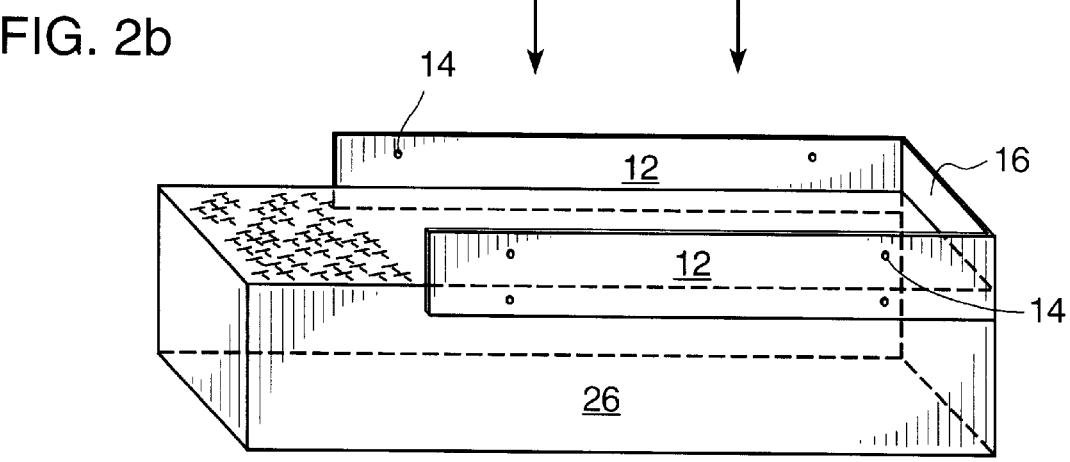
Figure 2C:
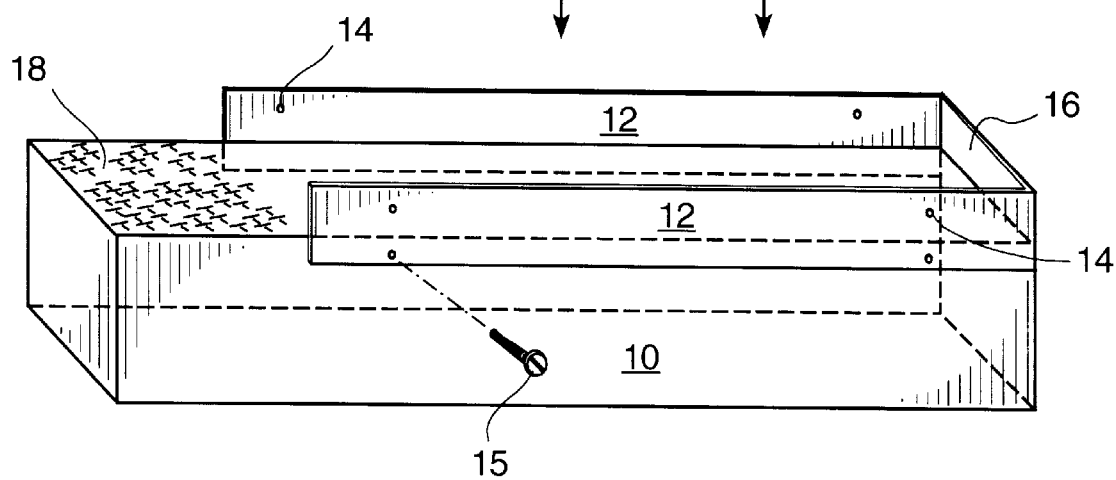
Figure 3A:
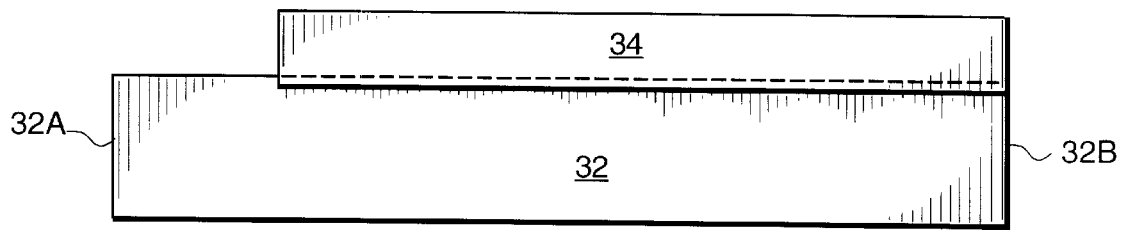
FIG. 3a is a side elevation view of an alternative embodiment of the invention.
Figure 3B:
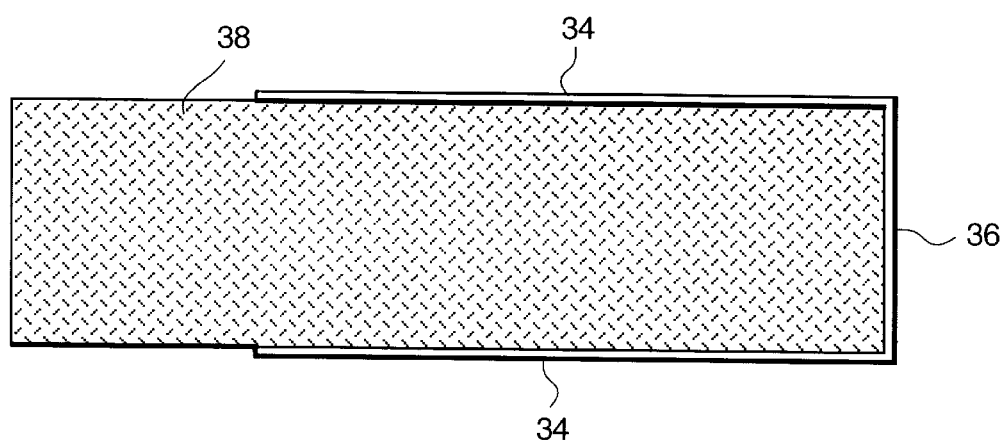
FIG. 3b is a top plan view of the alternative embodiment of the invention.
Figure 3C:
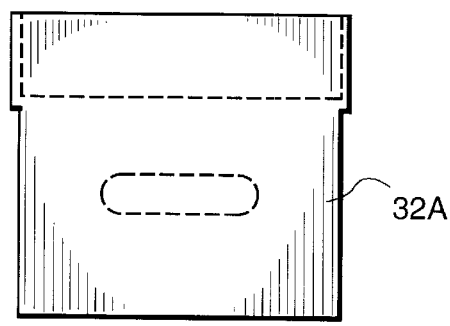
FIG. 3c is one view of the alternative embodiment of the invention.
Figure 3D:
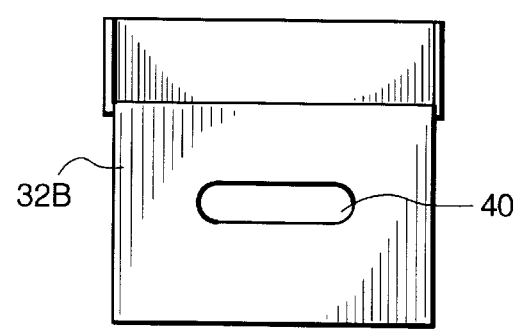
FIG. 3d is another end view of the alternative embodiment of the invention.

Referring now to FIGS. 2a, 2b and 2c, the invention consist of up to three or more rectilinear box like structures, including a base 10, intermediate member 26 and top member 28. Members 10 and 26 are distinguished from member 28 which has no side or back rails. Member 28 may also include a decorative friction surface 30 such as carpet material.

FIGS. 3a, 3b, 3c and 3d disclose a second embodiment of the invention. The box like structure 32 includes ends 32a and 32b along with side rails 34 and rear rail 36. The invention includes a friction surface 38 as disclosed with regard to FIG. 1. A hand hold aperture 40 is included in the back wall 32b to assist in convenient of the steps. The embodiment includes multiple stackable members formed of suitable molded plastic.

Figure 4:
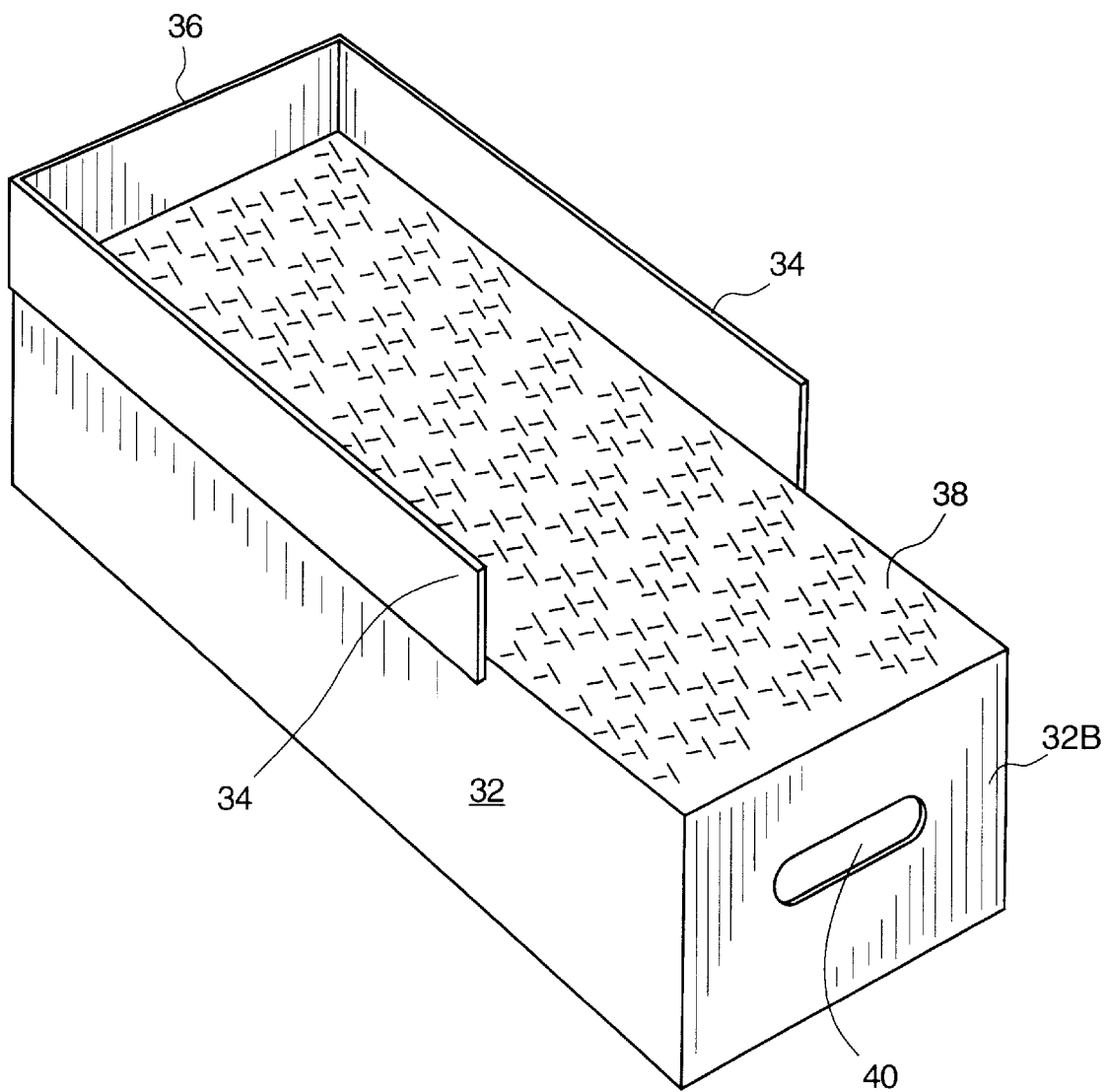
FIG. 4 is a perspective view of the alternative embodiment of the invention.

FIG. 4 is a perspective view of the molded plastic base member 32. Side rails 34 and back rail 36 are molded with member 32 forming one piece construction. The hand hold 40 may be place in the front or rear wall.

It should be understood, of course, that the foregoing disclosure relates to only i preferred embodiment of the invention and that numerous modifications or alterations may be made therein without departing from the spirit and scope of the invention as set forth in the appended claims.

What is claimed is:

1. An article of furniture for small animals comprising:
   (a) a first elongated rectilinear structure including a plurality of sides, top, bottom and ends,
   (b) side rails affixed to two sides and extending beyond the shortest dimension of each side, in one direction butt less than the full length of each side in another dimensions
   (c) a rear rail affixed to one end of the structure, connecting the two side rails,
   (d) a material, having a relatively high coefficient of friction, applied to the top surface of the stricture enclosed by the side and end rails.

2. An article of furniture according to claim 2, further comprising; a second elongated structure, including a plurality of sides, top, bottom, ends and side and end rails, adapted to fit within the area defined by the side and end rails of the first said structure and having a surface covered with a material having a relatively high coefficient of friction.

3. An article of furniture according to claim 2 further comprising; a third elongated structure adapted to fit within the side and end rails of the second said structure and having a surface covered with a relatively high coefficient of friction.

4. An article of furniture according to claim 4, wherein; each said structure is assembled.

5. An article of furniture according to claim 4, wherein; each said structure is molded.

6. An article of furniture according to claim 4, wherein; the said material is carpet.

7. An article of furniture according to claim 1, further including, a covering of friction material on the bottom, proximate each end of said structure.

8. An article of furniture according to claim 7, further including, an aperture in one end for grasping and moving the stricture.

* * * * *